United States Patent
Liu et al.

(10) Patent No.: US 9,286,026 B2
(45) Date of Patent: Mar. 15, 2016

(54) SYSTEM AND METHOD FOR RECORDING AND MONITORING USER INTERACTIONS WITH A SERVER

(75) Inventors: Yi-Li Liu, Delta (CA); Shih-yuan Huang, Shijr (TW); Chih-tao Hsieh, Shijr (TW)

(73) Assignee: ATEN INTERNATIONAL CO., LTD., Shijr (TW)

( * ) Notice: Subject to any disclaimer, the term of this patent is extended or adjusted under 35 U.S.C. 154(b) by 1061 days.

(21) Appl. No.: 13/400,560

(22) Filed: Feb. 20, 2012

(65) Prior Publication Data

US 2013/0054794 A1 Feb. 28, 2013

Related U.S. Application Data

(63) Continuation-in-part of application No. 11/530,367, filed on Sep. 8, 2006, now Pat. No. 8,120,583.

(51) Int. Cl.

| | |
|---|---|
| *G06F 15/173* | (2006.01) |
| *G06F 15/16* | (2006.01) |
| *G06F 3/02* | (2006.01) |
| *G09G 3/38* | (2006.01) |
| *G06F 3/14* | (2006.01) |
| *G06F 3/023* | (2006.01) |

(Continued)

(52) U.S. Cl.
CPC ............. *G06F 3/1438* (2013.01); *G06F 3/023* (2013.01); *G09G 2370/24* (2013.01); *H04L 63/0823* (2013.01); *H04L 67/08* (2013.01); *H04L 67/1097* (2013.01); *H04L 69/24* (2013.01)

(58) Field of Classification Search
CPC ....... H04L 67/08; H04L 67/025; H04L 67/10; H04L 67/32; H04L 67/36; H04L 67/38; H04L 67/40; H04L 67/1097; H04L 69/08; H04L 69/24; H04L 63/10; H04L 63/0815; H04L 63/0823; H04L 41/042; H04L 41/069; H04L 41/0803; H04L 41/22; H06F 3/023; H06F 3/038; H06F 3/1438; G06F 11/34; G06F 11/3476; G06F 21/83; G06F 21/84; G06F 21/85; G06F 2203/0383
USPC ......................... 709/224, 201, 210, 218–219; 345/156–172
See application file for complete search history.

(56) References Cited

U.S. PATENT DOCUMENTS

| | | | |
|---|---|---|---|
| 5,931,297 A | 8/1999 | Weill et al. | |
| 6,557,170 B1 * | 4/2003 | Wilder et al. | ................. 725/130 |

(Continued)

*Primary Examiner* — Farzana Huq
(74) *Attorney, Agent, or Firm* — Chen Yoshimura LLP

(57) ABSTRACT

A system includes multiple KVM switches, multiple user consoles and a recording system connected via a network. Each KVM switch facilitates interactions between user consoles and selected servers connected its server ports. The KVM switch transmits keyboard, mouse and video data exchanged between user consoles and servers, and administrative data, to the recording system. The recording system records the keyboard, mouse, video and administrative data, and detects trigger events based on such data. Trigger events include predefined keywords, mouse operations, video images, user IDs and server IDs, or combinations thereof. When a trigger event is detected, the recording system automatically transmits monitoring information to an administrative console via the network. The monitoring information may include combined video data containing information about keyboard and mouse actions superimposed on desktop images. The administrative console may also request specific recorded data for review. The recording system may employ a master-slave configuration.

22 Claims, 8 Drawing Sheets

(51) Int. Cl.
    *H04L 29/08* (2006.01)
    *H04L 29/06* (2006.01)

(56) References Cited

U.S. PATENT DOCUMENTS

| | | | |
|---|---|---|---|
| 7,478,182 B2 | 1/2009 | Schweig | |
| 7,546,334 B2 | 6/2009 | Redlich et al. | |
| 7,853,740 B2 * | 12/2010 | Liaw et al. | 710/62 |
| 2003/0046311 A1 | 3/2003 | Baidya et al. | |
| 2003/0053003 A1 | 3/2003 | Nishi et al. | |
| 2003/0079055 A1 * | 4/2003 | Chen | G06F 3/002 710/1 |
| 2004/0168030 A1 | 8/2004 | Traversat et al. | |
| 2004/0205276 A1 | 10/2004 | Ferguson | |
| 2004/0215742 A1 | 10/2004 | Cook et al. | |
| 2004/0222944 A1 | 11/2004 | Sivertsen | |
| 2004/0225952 A1 | 11/2004 | Brown et al. | |
| 2004/0233234 A1 | 11/2004 | Chaudhry et al. | |
| 2004/0268012 A1 | 12/2004 | Ferguson | |
| 2005/0033987 A1 | 2/2005 | Yan et al. | |
| 2005/0044266 A1 | 2/2005 | O'Neil | |
| 2005/0044542 A1 | 2/2005 | Grimaud et al. | |
| 2005/0060567 A1 | 3/2005 | Shannon et al. | |
| 2005/0063108 A1 | 3/2005 | Voll et al. | |
| 2005/0076102 A1 | 4/2005 | Chen et al. | |
| 2005/0083487 A1 | 4/2005 | Hunt et al. | |
| 2005/0086300 A1 | 4/2005 | Yeager et al. | |
| 2005/0104892 A1 | 5/2005 | Covington et al. | |
| 2005/0114894 A1 * | 5/2005 | Hoerl | H04N 7/17336 725/74 |
| 2005/0125519 A1 * | 6/2005 | Yang | G06F 3/14 709/223 |
| 2005/0132070 A1 | 6/2005 | Redlich et al. | |
| 2005/0132087 A1 | 6/2005 | Glinski et al. | |
| 2005/0138109 A1 * | 6/2005 | Redlich et al. | 709/201 |
| 2005/0138110 A1 | 6/2005 | Redlich et al. | |
| 2005/0172039 A1 | 8/2005 | Hsu | |
| 2005/0175196 A1 | 8/2005 | Chen et al. | |
| 2005/0238186 A1 | 10/2005 | Chen et al. | |
| 2005/0267931 A1 | 12/2005 | Chen et al. | |
| 2005/0286790 A1 | 12/2005 | Gilgen | |
| 2006/0057996 A1 | 3/2006 | Petrovic et al. | |
| 2006/0106585 A1 | 5/2006 | Brown et al. | |
| 2006/0111880 A1 | 5/2006 | Brown et al. | |
| 2006/0119594 A1 | 6/2006 | Ahern et al. | |
| 2006/0167642 A1 | 7/2006 | Ferrer et al. | |
| 2006/0181480 A1 | 8/2006 | Yee | |
| 2007/0115992 A1 * | 5/2007 | Weinstock | G06F 3/0277 370/392 |
| 2007/0261097 A1 | 11/2007 | Siegman et al. | |
| 2008/0040527 A1 * | 2/2008 | Filipov | G06F 1/1632 710/303 |
| 2009/0125654 A1 * | 5/2009 | Lou | 710/73 |
| 2010/0100652 A1 * | 4/2010 | Lin et al. | 710/73 |

* cited by examiner

SYSTEM AND METHOD FOR RECORDING AND MONITORING USER INTERACTIONS WITH A SERVER

This application is a continuation-in-part application under 35 USC §120 of U.S. application Ser. No. 11/530,367, filed Sep. 8, 2006, allowed, which is herein incorporated by reference in its entirety.

BACKGROUND OF THE INVENTION

1. Field of the Invention

This invention relates to recording and monitoring of server and user activities, and in particular, it relates to a system and related method for automatically triggering recording and/or monitoring of server and user activities upon detecting pre-defined trigger events.

2. Description of the Related Art

For a business, its commercial secret is treasure, which is necessary to be kept confidential, not to mention a military base, which needs confidential communication always and strictly because of national security. In a web time like today, network can let people reach the place that can never be imaged. Therefore, most autonomous networks of aforesaid autonomies would have at least one administrator for supervising or monitoring all users' activity in the network for aforesaid reason. For example, a general monitoring method is to keep eyes on the respective data transmission flow rate of all users' computers, consoles or to set different authorization levels for different users in advance for this network area.

At present, keyboard-video-mouse switches (KVM switches) have become a network management solution. Similar as being aforementioned, an administrator who is in charge of managing the network construction, which mainly consists of keyboard-video-mouse switches, also has to deal with such issue for keeping information confidential inside. An active monitoring method on the users' activity is to detect their keyword input from the consoles where the users are operating. Once a predetermined keyword is detected, the administrator gets a notice according to some pre-settings of the keyboard-video-mouse switch, such as, alarming to the related; starting to recording keyboard-video-mouse data from the console, which the user inputted a keyword and the corresponding computer. Unfortunately, there is no any keyboard-video-mouse switch realizing such consideration of detecting keywords so far.

SUMMARY OF THE INVENTION

Accordingly, the present invention is directed to a method and system for recording and monitoring user activities that substantially obviates one or more of the problems due to limitations and disadvantages of the related art.

An object of the present invention is to provide a system that can record user activities and can allow real-time monitoring of user activities when certain trigger events are detected.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a system for recording and monitoring user interactions with a server, which includes: at least one keyboard, video, mouse (KVM) switch connected to a network, the KVM switch including: a network interface section for communicating data over the network; a switching section coupled to the network interface section; and a plurality of server ports coupled to the switching section each adapted for connecting to a server, wherein the switching section forwards data between the network interface section and selected ones of the server ports; a recording system connected to the network; wherein the KVM switch receives, via the network, keyboard data and mouse data from a user console connected to the network, forwards the keyboard data and mouse data to a selected server port, receives video data representative of desktop images from the selected server port, and processes the video data and transmits it via the network to the user console; wherein the KVM switch further transmits the keyboard data and mouse data received from the user console and the video data received from the selected server port to the recording system via the network; wherein the recording system records the keyboard data, mouse data and video data received from the KVM switch, detects trigger events based on at least one of the received keyboard data, mouse data and video data, and wherein when a trigger event is detected, the recording system automatically transmits monitoring information to an administrative console via the network.

In another aspect, the present invention provides a method implemented in a recording system for recording and monitoring user interactions with a server, which includes: receiving, from a KVM switch over a network, keyboard data, mouse data and video data representative of interactions of a user console with a selected server connected to the KVM switch; recording the keyboard data, mouse data and video data received from the KVM switch; detecting trigger events based on at least one of the received keyboard data, mouse data and video data; when a trigger event is detected, automatically transmitting monitoring information to an administrative console via the network.

It is to be understood that both the foregoing general description and the following detailed description are exemplary and explanatory and are intended to provide further explanation of the invention as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

As required, a detailed illustrative embodiment of the present invention is disclosed herein. However, techniques, systems, operating structures and methods in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of preferred embodiments (as well as some alternative embodiments) of the present invention.

Figure 1:
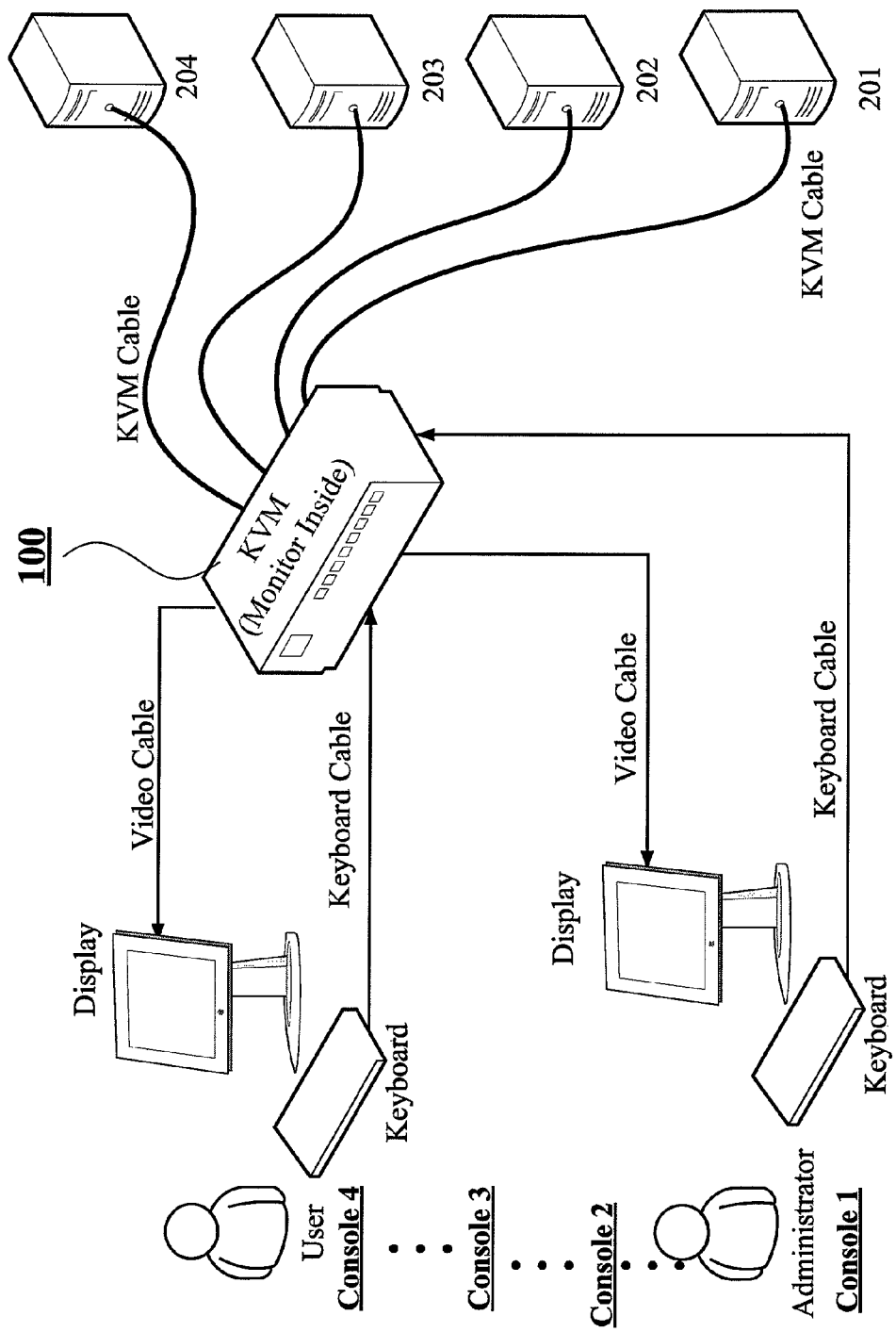
FIG. 1 schematically illustrates a keyboard-video-mouse switch coupled with a number of computers and a number of consoles; wherein the administrator can monitor the video data from the computer, which the user remote controls and the keyboard input data from the console, which the user operates according to a first embodiment of the present invention.

Please refer to FIG. 1, which schematically illustrates a keyboard-video-mouse switch 100 coupled with four computers (201, 202, 203 and 204) and four consoles (console 1, console 2, console 3, and console 4). The administrator (located at one of the consoles, e.g. console 1 in FIG. 1) may monitor the video data from one of the computers, which is selected by a user located at another console, and monitor the keyboard input data from the console, which is operated by the user. In the embodiment shown in FIG. 1, the numbers of the computers and consoles coupled with the keyboard-video-mouse switch 100 are four but the present invention is not limited to this particular example.

For instance, when an administrator works at the console 1 and a user is operating the computer 204 at console 4, if the user keys in a word "p-a-t-e-n-t", which has been inputted (defined) as a monitored keyword and stored in a keyword database of the keyboard-video-mouse switch 100 by the administrator in advance, the keyboard-video-mouse switch 100 automatically sends an alarm message to the console 1 (administrator), and shows a warning, such as a "suspected intention-user name-console 1", on the display of the console 1 to let the administrator know that the user might be attempting to access confidential information related with the keyword "p-a-t-e-n-t".

Moreover, the keyboard-video-mouse switch 100 may further transmits the video data from the computer 204, which is operated by the user, to the administrator's console 1 simultaneously to show the real-time operation status of the user on the display privately. Furthermore, the keyboard-video-mouse switch 100 may start to record the video data and the keyboard input data of the console 4 in a storage device as an evidence or a record for administrator's post-check if necessary. Specifically, the input method which can be detected, is not only English but also other input methods of different languages as long as the target keywords are inputted (defined) in the keyword database beforehand.

Figure 2:
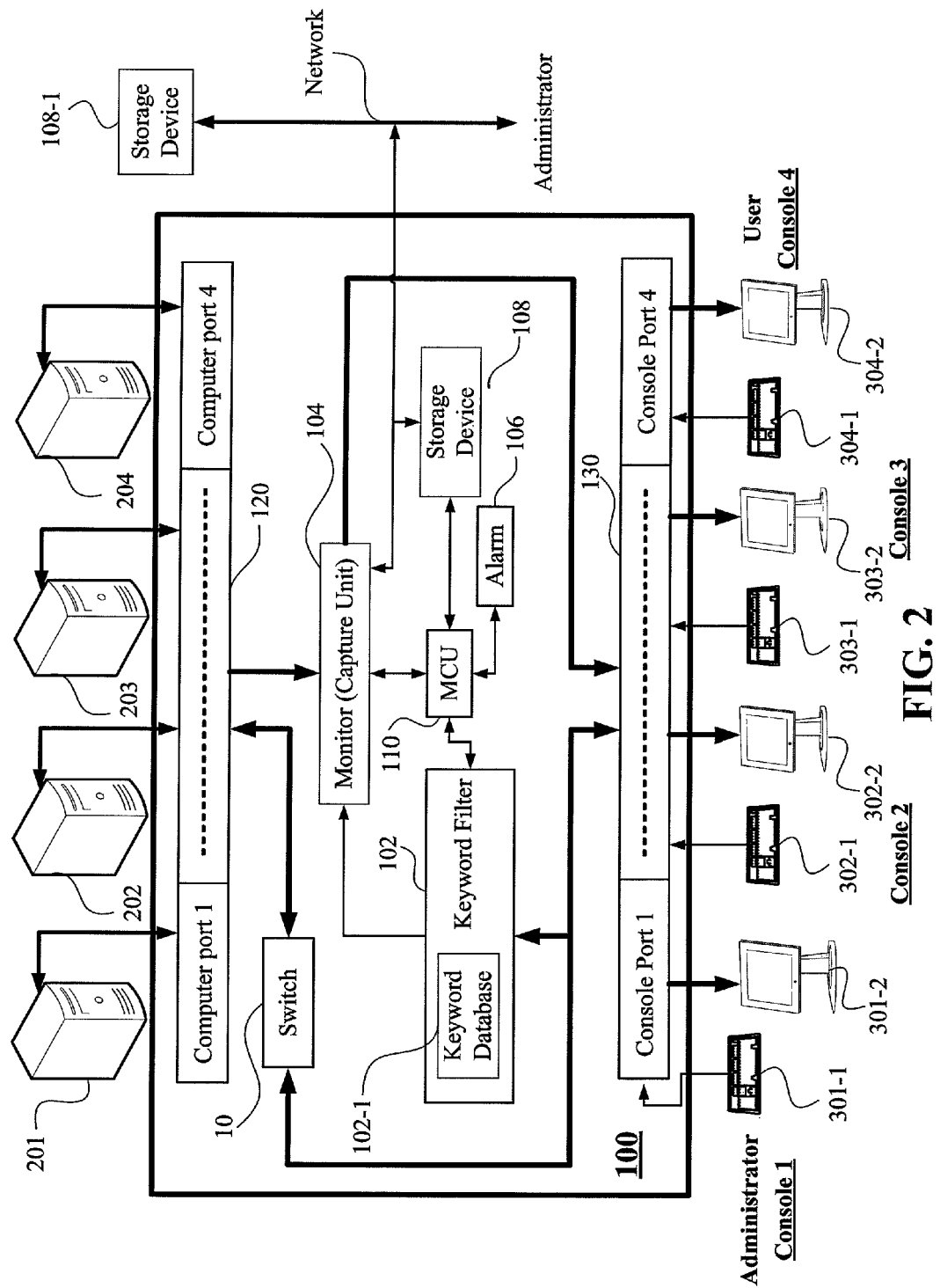
FIG. 2 illustrates a functional block diagram of keyboard-video-mouse switch of the first embodiment shown in FIG. 1.

Please refer to FIG. 2, which illustrates a functional block diagram of keyboard-video-mouse switch of the first embodiment of the present invention shown in FIG. 1. The keyboard-video-mouse switch 100 includes a switch 10, a keyword filter 102, a keyword database 102-1, a capture unit 104, an alarm 106, a storage device 108, a micro control unit 110, a plurality of computer ports 120 and at least one console port 130. The computer port 120 further includes computer ports 1 to 4 for respective computers and the console port 130 further includes console ports 1 to 4 for respective consoles. The switch 10 is employed to route the keyboard-video-mouse signals among the computer ports 1 to 4 and the console ports 1 to 4. Therefore, the keyboard-video-mouse switch 100 is coupled with computers 201 to 204 via the computer ports 1 to 4 and coupled with the consoles (console 1 to console 4) via the console ports 1 to 4. The console 1, which may be controlled by an administrator, includes a keyboard 301-1, a display 301-2 and a mouse, which is not shown. Same Similar as the console 1, the console 4, which may be controlled by a user, includes a keyboard 304-1, a display 304-2 and a mouse, which is not shown.

Mainly, the keyword filter 102 is in charge of detecting whether a predetermined keyword, such as "p-a-t-e-n-t", is inputted from the console 4 into the computer 204 or other computers. If the keyword input is detected, the capture unit 104 records video data from the computers 204 and stores the video data in the storage device 108. Meanwhile, the alarm 106 may alarm the administrator, who is near the console 1. Furthermore, the capture unit 104 may record and store keyboard input data from the console 4 as recording and storing the video data from the computer 204 as aforementioned. The micro control unit 110 is a processor for processing, controlling all aforesaid units, devices in the keyboard-video-mouse switch 100. Moreover, the keyword database 102-1 in this embodiment shown in FIG. 2 is inside the keyword filter 102 but it can be located outside the keyword filter 102 as an option. The keyword database 102-1 may store data of many keystroke combinations, defined as predetermined keyword data for input methods, such as English and Chinese. The way of the keyword filter 102 to identify if the keyword is inputted is to compare the keyboard input data from the console 4 with the keyword data pre-defined and stored in the keyword database. More detail about the comparison of the keyboard input data and the keyword data is described later by referring to FIG. 3.

Specifically, the aforesaid storage device 108 can be a memory, which is not restricted in the keyboard-video-mouse switch 100. Therefore, the memory can be a storage device 108-1, which is coupled to the keyboard-video-mouse switch 100 via a network for keeping the recorded keyboard input data and the video data more confidential. Moreover, the aforesaid administrator is not restricted to operate at the console 1, either. The administrator also can supervise and monitor the whole network system, which is mainly constructed by the keyboard-video-mouse switch 100 via the network.

Figure 3:
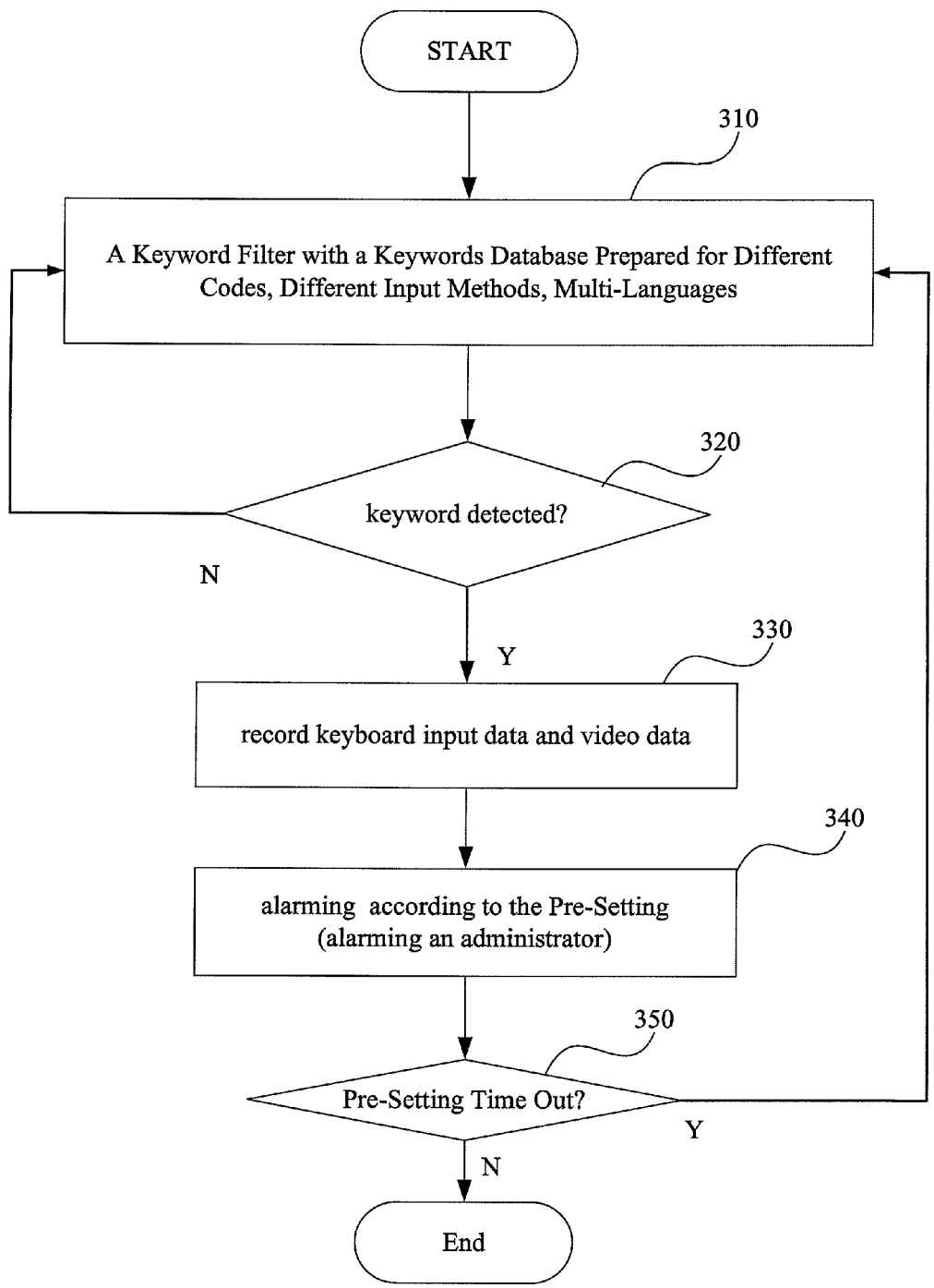
FIG. 3 shows a flow chart of a monitor procedure of the keyword input for different codes, different input methods and multi-Languages according to the first embodiment.

Please refer to FIG. 3, which shows a flow chart of a monitor procedure of the keyword input for different codes, different input methods or multi-Languages according to the first embodiment. A manufacturer of a keyboard-video-mouse switch may input (pre-define) keywords before delivering the product to the markets. Alternatively, an administrator of a keyboard-video-mouse switch may also input (define) keywords of at least one input method for monitoring and stores them in a keyword database according to their demands. In procedure 310, the administrator may input (define) keywords of ordinary input method in English, such as aforesaid "p-a-t-e-n-t". Moreover, the administrator may input keywords of Phonetic input method in Traditional Chinese, Hanzi keyboard input method in Traditional Chinese, Tsang-Jye input method in Traditional Chinese, Hanzi keyboard input method in Simplified Chinese or Roma-ji input method in Japanese according to practical demand.

Basically, for input methods in English and English-like languages, the comparison of the keyboard input data from one of the consoles and the keyword data in the keyword database may be performed by the keyword filter letter by letter. For the aforesaid "p-a-t-e-n-t", for example, once "p" is inputted at first, the comparison will be started, and next "a" is inputted, the comparison is going to be continued. If the next inputted letter is not "t", the comparison will be terminated and back to procedure 310. If the comparisons of the six letters are all matched in order, i.e. the keyword is detected as shown in procedure 320, the monitor procedure of the first embodiment will proceed to the next procedure 330, recording the keyboard input data and the video data as aforementioned. Furthermore, in procedure 340, the monitor procedure of the first embodiment may alarm the administrator according to the pre-settings of the keyboard-video-mouse switch, such as alarming the administrator by showing a "suspected intention-user name-console 1" warning on a display, sending a notice message to the administrator's cellular phone, buzzing for scaring the user, or directly locking the door of the room where the user is. In procedure 350, the monitor procedure of the first embodiment may not stop recording the keyboard input data and the video data until a time-out condition happens according to the pre-settings. If the time out condition happens, the monitor procedure of the first embodiment returns back to the procedure 310. If the time out condition does not happen, the capture unit shown in FIG. 2 keeps recording and storing the keyboard input data and the video data in the storage device. The time out condition can be illustrated as a stop command from administrator, a predetermined period of time for recording, or the aforesaid alarming according to the pre-settings of the keyboard-video-mouse switch had been executed completely. Furthermore, the comparison of the keyboard input data from one of the consoles and the keyword data in the keyword database also can be performed word by word. For aforesaid "p-a-t-e-n-t", until all the letters are inputted (after "space" keystroke or after "enter" keystroke), the comparison will not be started.

Specifically, for many different input methods in Chinese and Japanese languages developed from pictograph, there are BIG 5 code (Traditional Chinese), GB 2312 code (Simplified Chinese) and EUC Shift-JIS code (Japanese) for transforming the corresponding keyboard inputs into their special characters as standard. The comparison of the keyboard input data and the keyword data is performed character by character. For instance, according to Hanzi keyboard input method in Traditional Chinese, the word "patent law" is pronounced and inputted as "zhuan-li-fa". If the character "zhuan" is inputted at first, the comparison will be started, and next character "li" is inputted, the comparison is going to be continued. If the next inputted character is not "fa", the comparison will be terminated and back to procedure 310. If the comparisons of the three characters are all matched in order, i.e. the keyword "zhuan-li-fa" is detected as shown in procedure 320, the monitor procedure of the first embodiment will proceed to the next procedure 330, recording the keyboard input data and the video data.

Similar comparisons of Hanzi keyboard input method in Traditional Chinese as aforementioned are also executed for Phonetic input method in Traditional Chinese, Tsang-Jye input method in Traditional Chinese, Hanzi keyboard input method in Simplified Chinese or Roma-ji input method in Japanese if the administrator input s the keywords in different codes, different input methods and multi-Languages in advance. Furthermore, the method of detecting keyword according to the first embodiment is also suitable for handwrite input method, voice input method or other input methods for English, Chinese, Japanese or other languages according to the similar principle of the input coding thereof.

Figure 4:
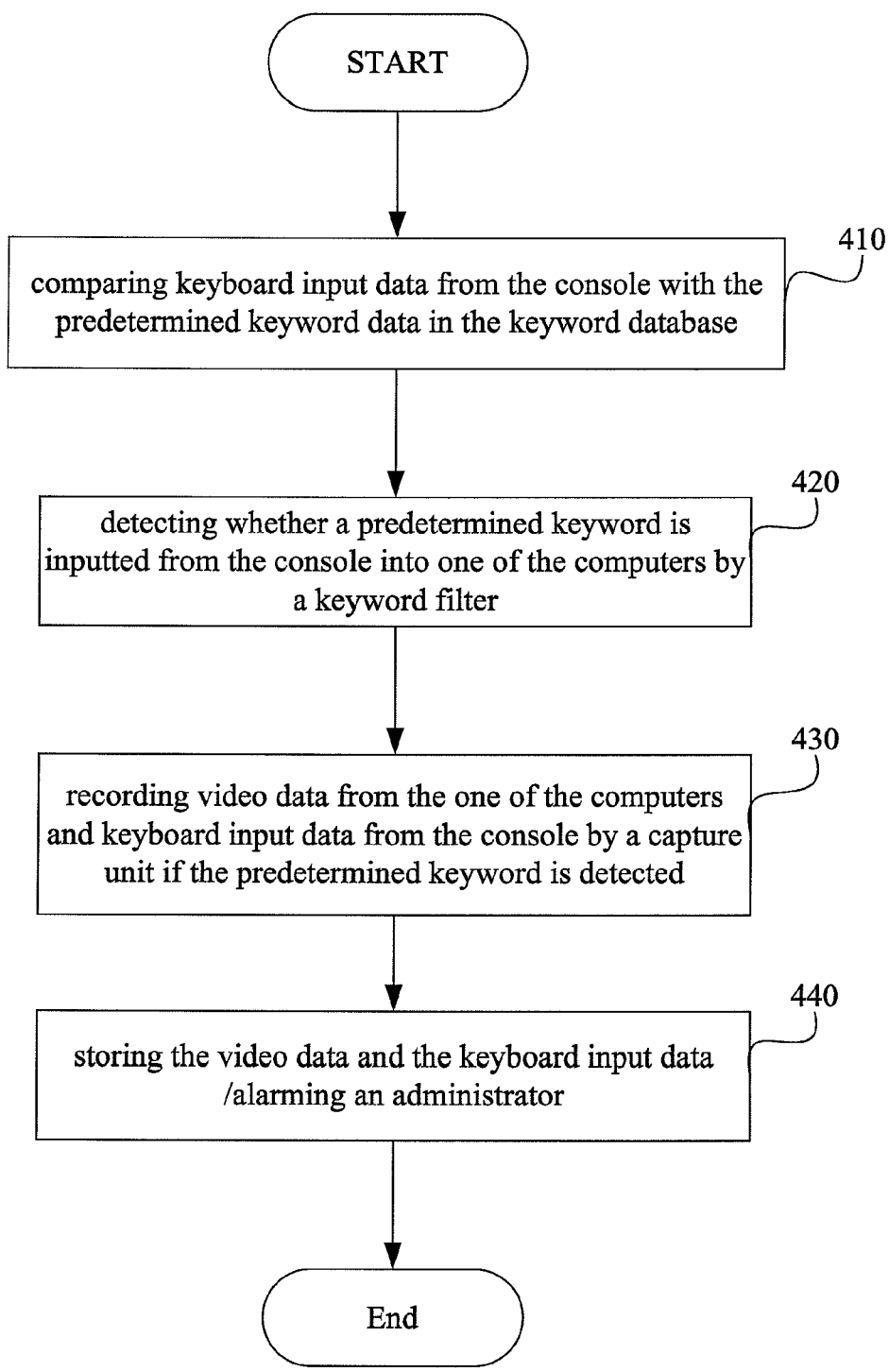
FIG. 4 shows a flow chart of a method for detecting keyword input for a keyboard-video-mouse switch according to the first embodiment.

Please refer to FIG. 4, which depicts a flow chart of a method for detecting a keyword input for a keyboard-video-mouse switch to accomplish the objectives of the first embodiment.

The present method includes the following steps:

Step 410, comparing keyboard input data from the console with the predetermined keyword data in the keyword database;

Step 420, detecting whether a predetermined keyword is inputted from the console into one of the computers by a keyword filter;

Step 430, recording video data from the one of the computers by a capture unit if the predetermined keyword is detected; and Step 440, storing the video data and the keyboard input data, and/or alarming an administrator.

According to the first embodiment, once a predetermined keyword inputted from a console is detected, the keyboard-video-mouse switch can record the video data from a computer and the keyboard input data from a console for different codes, different input methods or multi-Languages.

Figure 5:
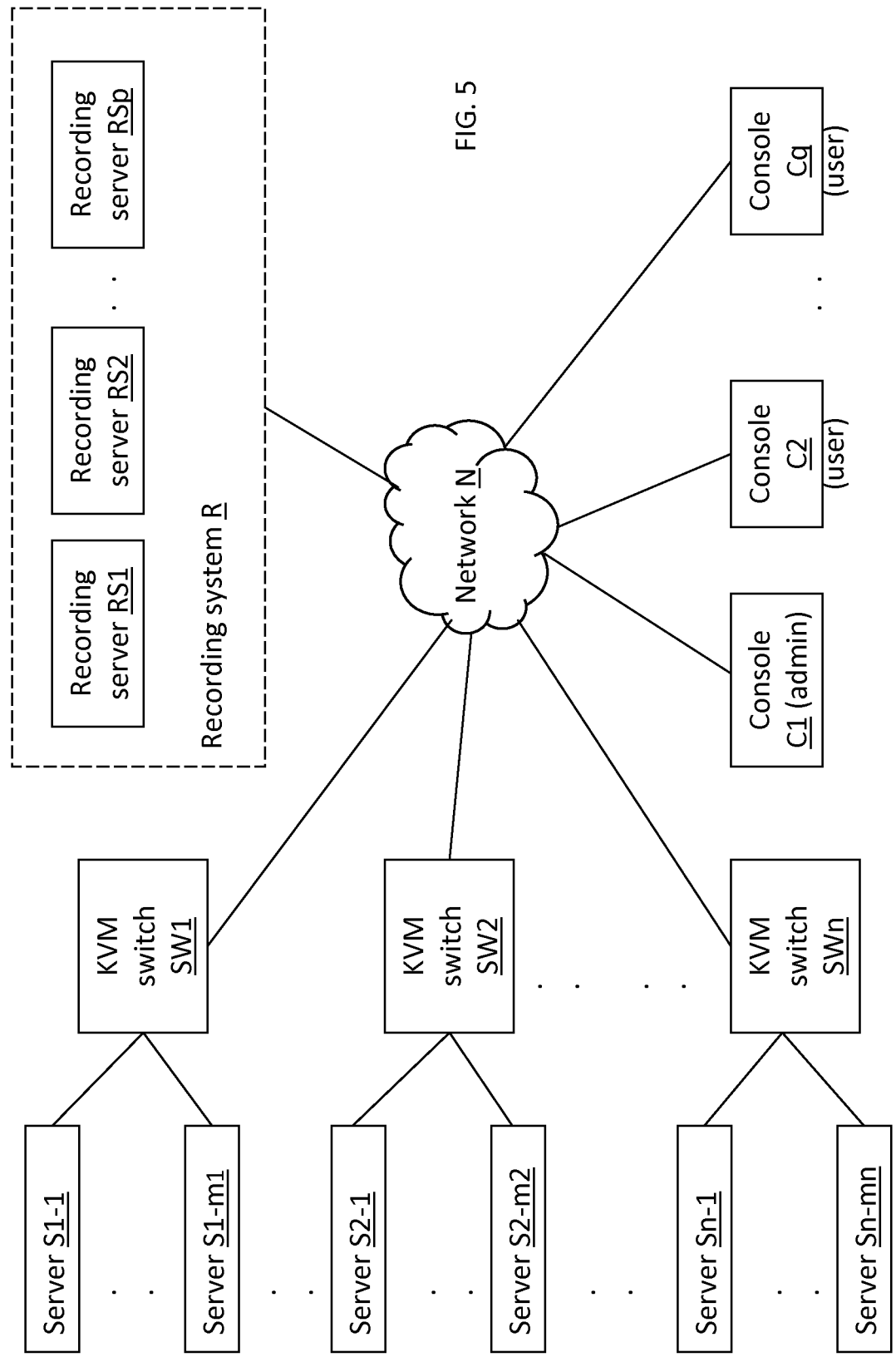
FIG. 5 schematically illustrates a distributed system which include KVM switches, servers, recording system, and console computers, in which a second embodiment of the present invention is implemented.

FIG. 5 illustrates a distributed system in which a second embodiment of the present invention is implemented. As shown in FIG. 5, the system includes one or more KVM switches SW (SW1, SW2, ... SWn), one or more servers S (S1-1, ... S1-m1, ... Sn-mn) each connected to a KVM switch, and one or more console units C (C1 ... Cq). Each console unit C (also referred to as a client computer) includes a display monitor, user input devices such as a keyboard and/or a mouse, and a computer. The KVM switches SW and the console units C are connected to each other via a network N, such as an intranet, the Internet, or other suitable networks, and communicate with each other using a network protocol such as TCP/IP.

Figure 6:
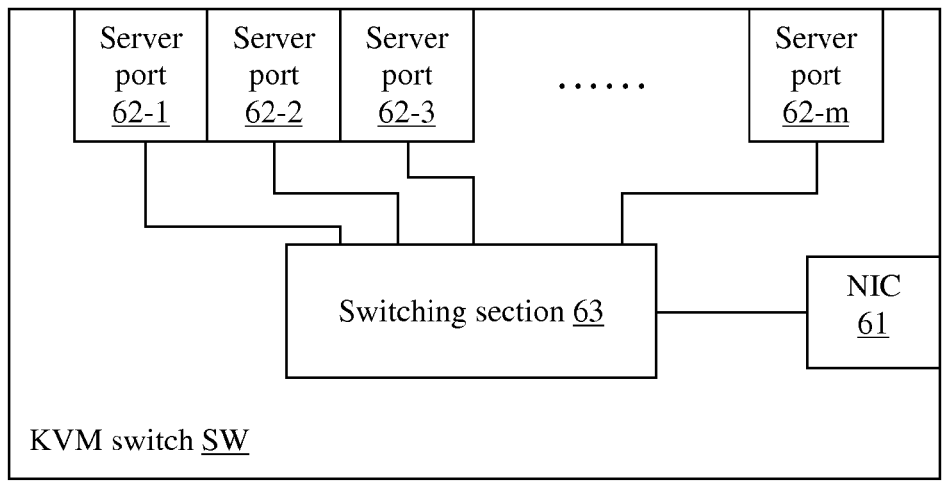
FIG. 6 schematically illustrates a KVM switch useful in the system of FIG. 5.

As shown in FIG. 6, each KVM switch SW includes a network interface section (NIC) 61 for communicating with the network, a plurality of server ports 62 (62-1, ... 62-m) each for connecting to a server S, and a switching section 63 for forwarding the data between the network interface section 61 and selected server ports. The switching section may include a processor, a circuit, or other suitable components. A user located at a user console C may use the user console to log in to one of the KVM switches SW, and once logged in, the user can select one of the servers S connected to the KVM switch and exchange keyboard, video and mouse signals with the selected server. This framework is sometimes called "KVM over IP" or "IKVM" system, by which users can access selected servers via a network. KVM over IP technology is generally known and its operation details is not described here. In addition, according to the second embodiment of the present invention, the KVM switch SW includes hardware (such as processor and memory, which may be a part of the switching section 63) and software or firmware (e.g. stored in the memory) for carrying out the process of transmitting keyboard, mouse, video data and administrative data over the network to the recording system R as will be described in detail later.

Referring back to FIG. 5, the distributed system also includes a recording system R connected to the network N, which includes one or more recording servers (sometimes referred to as video log servers) RS (RS1, ... RSp). The KVM switches SW can transmit, via the network N, keyboard, mouse, and video data (i.e. data exchanged between a user console C and a server S connected via that KVM switch) to the recording system R for recording. The KVM switch can also transmit related administrative data to the recording system, such as a user ID of the user, an ID of the server selected by the user, etc. The recording system R receives the keyboard, mouse, video data and administrative data via the network and records (stores) them in one or more storage devices (not shown in FIG. 5) connected to the recording servers RS. The storage devices may be connected to the recording servers RS locally, or via the network N or a separate network.

According to the second embodiment of the present invention, while keyboard, mouse, video data and administrative data from the KVM switches are recorded by the recording system R, the recording system detects pre-defined trigger events based the data received from the KVM switches, and automatically transmits certain information to an administrative console via the network N. The information transmitted to the administrative console (referred to as monitoring information) may include the video, keyboard and/or mouse data, and/or administrative data, and/or a suitable message constituting an alarm, etc. This automatic transmission of monitoring information by the recording system to the administrative console is referred to as administrative monitoring in this disclosure. The administrative console is one of the console units C (C1 in the example shown in FIG. 5). The administrative console may be equipped with special software to communicate with the recording system and to display the monitoring information. The other user consoles C are consoles subject to monitoring. It should be noted that any user console C may serve as the administrative console (provided the console is equipped with any necessary software), depending on which console the administrative user (a user with administrative privileges) uses to log in to the system. Alternatively, the administrative console may be a special monitor device dedicated to displaying the monitoring information.

The trigger events may include one or more of the following:

(1) Keywords: When the keyboard data inputted from a user console contain certain keywords, administrative monitoring may be triggered.

(2) User ID: When certain users are logged in to a KVM switch, administrative monitoring may be triggered.

(3) Server ID: When certain servers connected to certain KVM switches are selected by a user, administrative monitoring may be triggered. The server may be identified by an ID of the server port (e.g. port name or port number) to which it is connected. Alternatively, in some KVM switch configurations, an extender device is connected between the KVM switch and a server to extend the distance between them. Such extenders typically have their own IDs. Often, an extender (along with the server connected to it) may be disconnected from one server port of a KVM switch and re-connected to another server port of the same or a different KVM switch. Thus, when an extender is used, it may be more convenient to identify the server by the ID of the extender to which it is connected, rather than the port ID, so that there will be no need to modify the definition of the trigger events because the extender ID has not changed, even thought the port ID has changed. The term "server ID" used here generally refers to either the port ID or the extender ID, or any other alternative suitable ways of identifying a server; it does not require a unique identifier assigned to the server itself.

(4) Mouse operation: When certain mouse operations such as a click in a particular area of the desktop are inputted from a user console C, administrative monitoring may be triggered. Because the meaning of a mouse operation will depend on the desktop image displayed on the user's monitor at that moment, triggering by mouse operations may be more useful in industrial applications such as when a server is controlling a machine; in such applications, the monitor display tends to be relatively less variable compare to other applications, and mouse locations tend to have a high correlation with known actions.

(5) Desktop image: When certain images are present in the video frames representing the desktop, administrative monitoring may be triggered. As an example, when a server crashes, its desktop tends to have certain characteristic appearance. Such images may be defined as trigger events.

A trigger event may also be a logic combination of two or more of the above factors, for example: certain keywords inputted by certain users, certain keywords directed to certain server ports, etc. The trigger events are pre-stored in a monitoring database accessible by the recording system R.

Figure 7B:
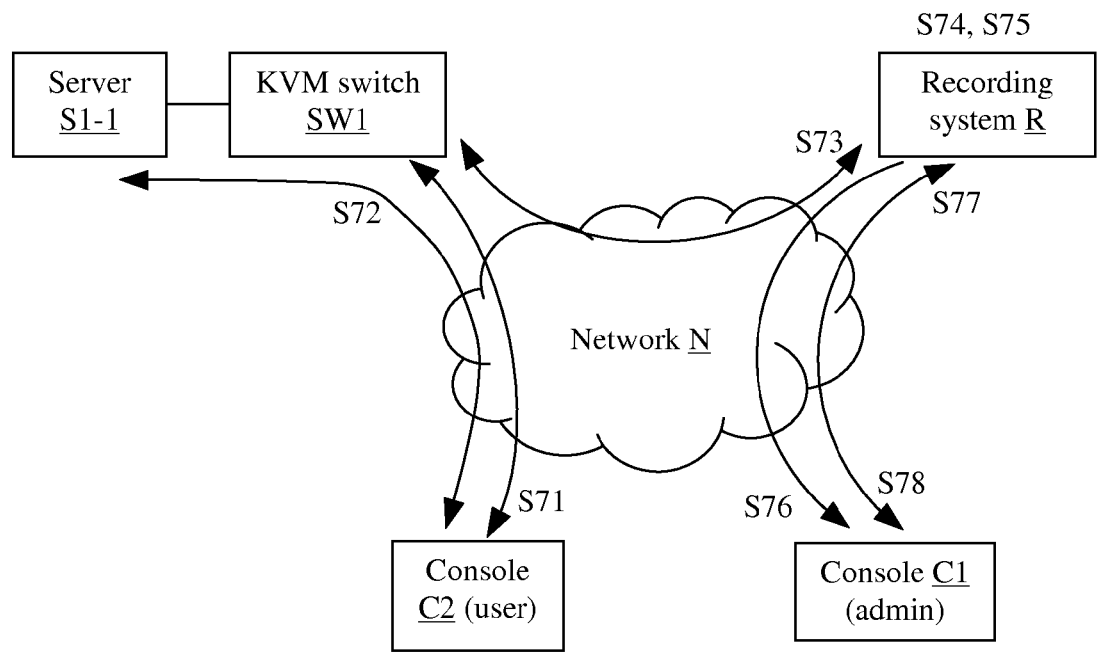
FIGS. 7A and 7B illustrate a method performed by various components of the system of FIG. 5 according to the second embodiment of the present invention.
Figure 7A:
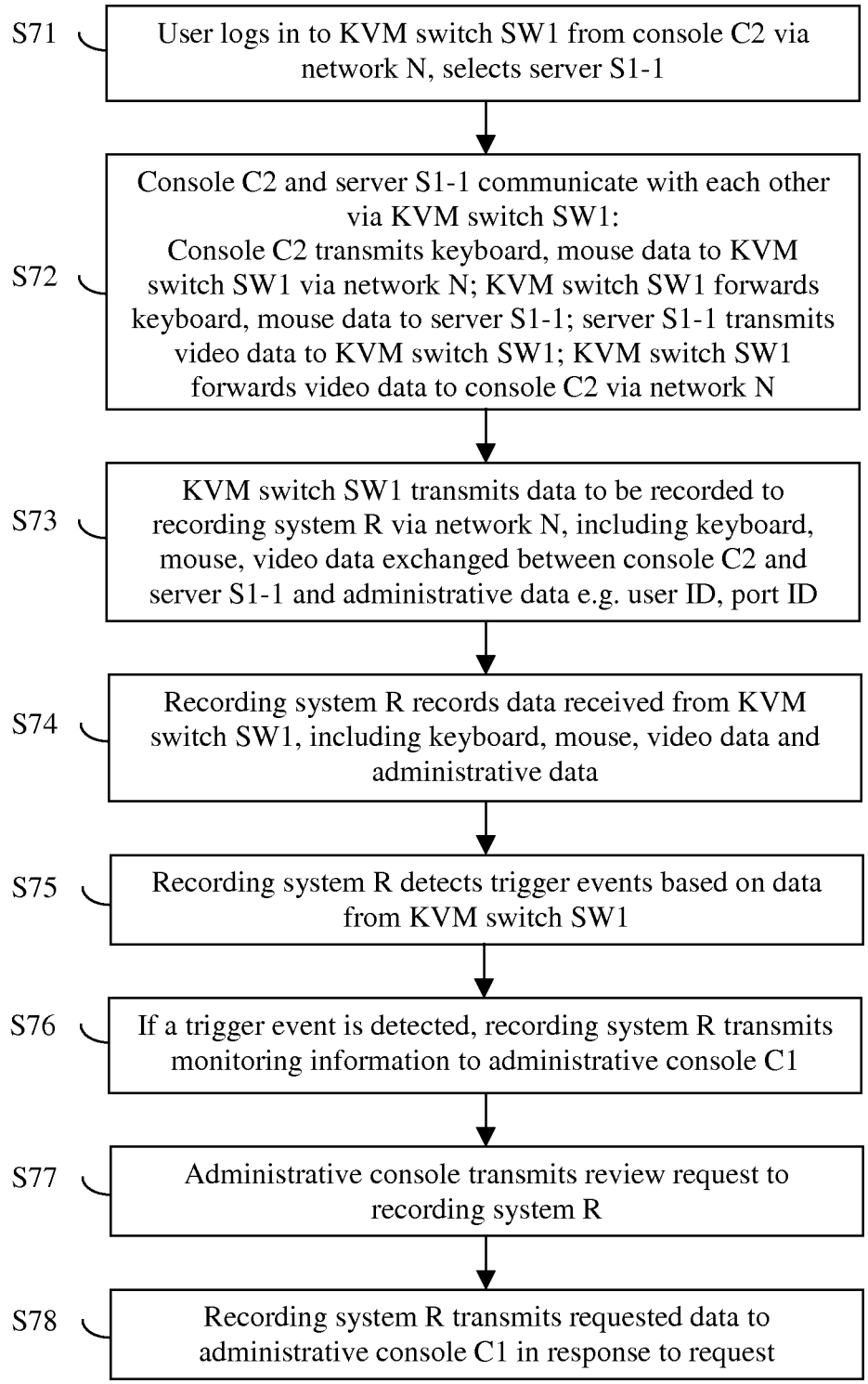

FIGS. 7A and 7B illustrate an operation of the system of FIG. 5 according to the second embodiment of the present invention. In process S71, a user logs in to one of the KVM switches (e.g. SW1) from a user console (e.g. C2) via the network N, and selects a server (e.g. S1-1) connected to the KVM switch SW1. In process S72, the user console C2 and the selected server S1-1 communicate with each other through the KVM switch SW1. During this process, the console C2 transmits keyboard and/or mouse data to the KVM switch SW1 via the network N; the KVM switch SW1 forwards the keyboard and/or mouse data to the selected server S1-1; the selected server S1-1 transmits video data representing the desktop to the KVM switch SW1; and the KVM switch SW1 processes and forwards the video data to the console C2 via the network. In the mean time, in process S73, the KVM switch SW1 transmits the keyboard, mouse and video data exchanged between the console C2 and server S1-1 to the recording system R via the network, along with administrative information such as the user ID, the server ID of the server selected by the user, etc.

In process S74, the recording system R records the keyboard, mouse and video data received from the KVM switch SW1. Such recording is sometimes referred to as session recording as it generates a record of the user login session between a user and a server. The recording system may also record the administrative data as desired. Any suitable format may be used to record the keyboard, mouse, video, and administrative data. In one particular implementation, the keyboard, mouse and/or administrative data is converted to video images which are then combined with (e.g., superimposed on) the video data received from the KVM switch (i.e. the desktop image). For example, a window or box may be generated to show the keys being typed, the mouse actions such as clicks being performed, the user ID, the server ID, etc., and the window is superimposed on the desktop video image. The combined (e.g. superimposed) video is then stored. This recording format has several advantages. First, the keyboard, mouse and administrative data is included in the video data and therefore do not need to be separately stored. Second, although in a typical situation the keyboard and mouse data are reflected in the desktop image (for example, if the user types a key into a word processing document, the corresponding window on the desktop will reflect the key being typed; and if the user moves the mouse, the mouse image on the desktop will move), in many instances a user keyboard or mouse action is not reflected in the desktop image (for example, a function key pressed by the user may not result in any change seen on the desktop, or some key or mouse input by the user may correspond to invalid or prohibited actions and therefore will not result in any change seen on the desktop). In such instances, the above recording method will clearly show the keyboard or mouse action even if the desktop is not changed. Third, when the recorded video is later played back, the administrator can see what keyboard and mouse actions are taking place in a clear and intuitive way.

In process S75, based on the keyboard, mouse and video data, as well as administrative data received from the KVM switch SW1, the recording system R detects whether any trigger events have occurred. As mentioned earlier, the trigger events may include keywords, mouse operations, user IDs, server IDs, desktop video image, etc. or combinations thereof. In process S76, if a trigger event is detected, the recording system R automatically alerts the administrative console by transmitting monitoring information regarding the console C2 to the administrative console C1. The monitoring information may be, for example, the combined (e.g. superimposed) video data representing the desktop image, the keyboard and mouse data as well as the user ID and server ID, as described above in connection with process S74. Such combined video data may be displayed in a window on the display of the administrative console C1 to allow the administrator to view the desktop and keyboard and mouse actions of the console C2 in real time. In another implementation, the recording system RS does not generate the combined video, but forwards the keyboard, mouse and video data as separate data to the administrative console. The administrative console may be equipped with special viewer software to generate a combined video image which shows the keyboard and mouse data similar to the combined video described above. One advantage of this implementation is that, different administrative users may have different levels of authorization, and some administrative users may not be allowed to see sensitive keyboard data such as password. The viewer software has the ability to determine, based on the level of authorization of the administrative user, which keyboard data is to be shown as a part of the video image. In yet another implementation, the recording system RS forwards to the administrative console the video and mouse data and some of the keyboard data, but does not forward certain sensitive keyboard data such as passwords. Alternatively, instead of the video data, the recording system R transmits to the administrative console, as the monitoring information, a suitable alarm message, such as a text message, a popup window, an audible alarm, a light, etc., similar to the alarm described in the first embodiment. The monitoring information may generally take any suitable form, and the recording system may allow the administrator to set the manner used by the recording system to transmit the monitoring information to the administrator.

Any suitable techniques can be used to implement the transmission of keyboard, mouse, video and/or administrative data by the KVM switches and to implement the recording of the data by the recording system. The process of detecting the trigger events may be implemented by any suitable algorithms. One example of detecting a keyword is described earlier in connection with the first embodiment. When the trigger event is a desktop image, image comparison is employed. As mentioned earlier, a monitoring database pre-stores various trigger events to be detected. The monitoring database may be edited by authorized users such as the administrator.

In addition to automatically alerting the administrator upon detecting the trigger events (process S76), the recording system R also allows the administrator to request previously recorded data for review. Thus, in process S77, the administrative console C1 transmits a review request to the recording system R which specifically identifies previously recorded data; in process S78, the recording system R transmits the requested data to the administrative console in response to the request.

Each of processes S71 to S78 may be continuously and/or repeatedly performed by the corresponding components. It should be noted that the order in which the processes are performed is not limited to that shown in FIG. 7A. Using this method, a user login session is continuously recorded by the recording system, but it is not monitored in real time by the administrator unless a trigger event has been detected. The administrator can take appropriate actions based on the monitoring, and can determine when to stop monitoring.

Figure 8:
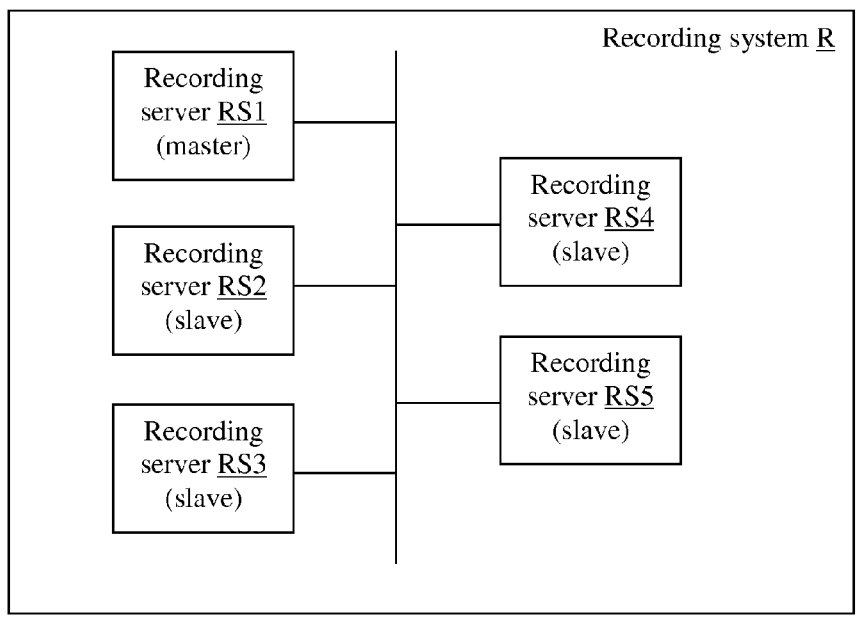
FIG. 8 schematically illustrates a recording system including a plurality of recording servers in a master-slave arrangement.

In one implementation, the recording system R includes multiple recording servers RS (RS1, . . . RS5) in a master-slave configuration, as shown in FIG. 8. The multiple recording servers RS are preferably connected together by a network such as an intranet which is connected to the network N. In this configuration, one of the recording servers (RS1 in this example) acts as a master and performs the function of distributing work load among the multiple recording servers. For example, the master can dynamically assign and re-assign which recording server RS (master or slave) is to perform recording for which KVM switch SW or which server S or which user login session based on the load of the recording servers RS. For example, the work load may be dynamically adjusted if a slave server is down.

Figure 9:
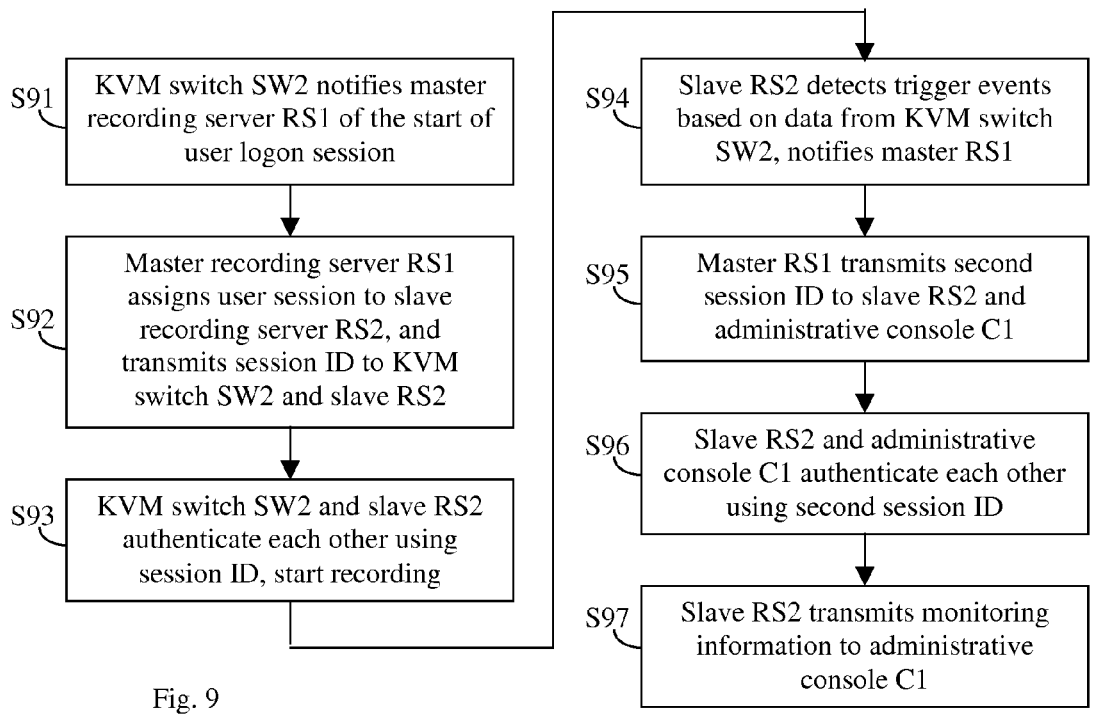
FIG. 9 illustrates an operation of the master-slave system shown in FIG. 8.

FIG. 9 illustrates a process for dynamically assigning a recording task to a recording server. When a user login session is started on a KVM switch (e.g. SW2), the KVM switch SW2 notifies the master RS1 of the user login session (step S91). In response to the notification, the master RS1 determines which recording server RS is to be assigned to record this user login session (step S92) (in this example, RS2 is assigned). The determination may be based on the current workload of the various recording servers. The master RS1 generates a session ID for this user login session and transmits the session ID to the KVM switch SW2 as well as the assigned recording server RS2 (step S93). The session ID includes necessary information, such as a unique string, that allows the KVM switch SW2 and the recording server RS2 to authenticate each other. Thereafter, the KVM switch SW2 and the recording server RS2 use the session ID to authenticate each other, and starts the recording (step S93). During recording (i.e. step S74 in FIGS. 7A and 7B is performed by the slave RS2), the KVM switch SW2 and the slave recording server RS2 may communicate directly with each other without further participation of the master RS1.

While recording, the slave recording server RS2 detects trigger events based on the data received from the KVM switch SW2 (step S94). In one implementation, if the slave RS2 detects a trigger event, it notifies master RS1 (step S94). In response, the master RS1 sends a second session ID to the slave RS2 and the administrative console C1 (step S95). The slave RS2 and the administrative console C1 use the session ID to authenticate each other (step S96); thereafter, the slave RS2 can directly transmit the monitoring information to administrative console C1 (step S97) without further participation of the master RS1.

In addition to performing the assignment functions, the master RS1 performs session recording in the same way as a slave. In step S92, the master RS1 may assign the user login session to itself, in which case it only needs to transmit the session ID to the KVM switch SW2.

In one implementation, each recording server RS stores the recorded session data in a storage device attached to itself, and the multiple recording servers RS may backup each other's data. In other words, session data recorded by one recording server may be copied to one or more other recording servers. This allows more flexibility in the recording system's ability to simultaneously perform both the functions of recording/detecting/alerting (processes S74/S75/S76) for real-time monitoring and the function of providing previously recorded data upon a review request (process S78). The backup may be managed by the master RS1, i.e., the master instructs one recording server to backup its data onto another recording server; or it may occur among the recording servers without specific instructions from the master. The master stores information regarding what data is stored on which recording server. Based on such information, the master can assign tasks to the slave to balance the workload of the recording servers In an illustrative example, suppose recording server RS3 recorded a user login session, and the recorded data D is backed up on recording servers RS4 and RS5. Subsequently, the master RS1 receives a review request from the administrative console to review the previously recorded data D. However, the master determines that at this time, recording server RS3 is recording another user login session, while recording server RS4 (which has the requested data D) is not performing any recording function. The master may then instruct recording server RS4 to provide the previously recorded data D to the administrative console. This way, the workload of the multiple recording servers can be more evenly distributed.

As mentioned earlier, the master recording server can perform all of the functions performed by a slave recording server. It should be noted that if the recording system contains only one server, it is considered a master. Further, if the master is down, another recording server can become a master. In other words, each server has the capability of being master. Implementation of such a master-slave system is known in the art and will not be described in detail here.

Referring back to FIGS. 7A and 7B, in steps S73 and S74, if the KVM switch continuously transmits all of the keyboard, mouse, and video data exchanged between a console C and a server S, a complete record of the user login session can be created by the recording system R. Complete session recording puts significant demand on system resources such as transmission bandwidth, processing power, video recording capacity, storage usage, etc. As an alternative or in addition, a series of snapshots of the desktop image may be taken of a user login session (or taken of a server port even when no user is logged on to that server) in lieu of continuous video recording. A snapshot is a frame of the desktop video image at a particular time point. Snapshots can record valuable information about the user login session (or the server even when no user is logged in) with greatly reduced demand on system resources.

Preferably, the KVM switch SW has multiple video processing channels and can process multiple video signals in parallel. Here, a video processing channel refers to a set of hardware for performing desired processing of a stream of video data (e.g., in a VGA format, or a digital format) and transmitting the processed video data to the recording system for recording. The processing may include, for example, A-to-D conversion, compression, etc. Thus, the KVM switch may use a number of video processing channels for continuous processing of video data from a corresponding number of server ports, and use one (or more) channel for generating snapshot video data of multiple ports in a scanning and rotating manner. In an illustrative example, the processing capacity of each video processing channel of the KVM switch SW is 10 frames/sec of video data. If the KVM switch scans 20 server ports, for example, one snapshot every 2 seconds can be taken for each port. The snapshot video data is a continuous stream of video data where each frame is a snapshot image of one server.

When scanning server ports for snapshots, ports that are not selected by any user may still be included for snapshots. The administrator may specify which ports of the KVM switch are to be scanned. To do this, the administrator may communicate with the master recording server RS1 to specify which ports of which KVM switches are to be scanned, and the master in turn instructs the KVM switches to scan the specified ports. The scanning is performed by the KVM switch SW, which transmits the snapshots as a stream of video data to the recording system R. The recording system R may separate the stream of video data and record them as multiple (e.g. 40) sequences of snapshots, one for each port.

Thus, in the method shown in FIGS. 7A and 7B, in steps S73 and S74, the video data may be either continuous video data sent by the server S1-1 to the console C2, or snapshots described above. The snapshots may be used to detect trigger events in step S75. As mentioned earlier, a type of trigger events are defined by certain images in the desktop image, such as images characteristic of a crashed server. Snapshots may be compared to images pre-stored in the monitoring database to detect trigger events in step S75. If a trigger event (e.g. a potential crash) is detected, an alert may be sent to the administrator in step S76. In addition, the administrator may later request review of the recorded snapshots in steps S77 and S78.

Further, in the method shown in FIG. 9, step S91 is modified for snapshot recording. Instead of reporting the start of a user logon session, the KVM switch SW2 may report to the master recording server RS1 the start of a snapshot recording session. Alternatively, the snapshot recording may be initiated at the request of the master RS1, in which case step S91 is omitted.

From the above descriptions, it can be seen that one difference between the first embodiment (FIGS. 1-4) and the second embodiment (FIGS. 5-7B) is that in the first embodiment, the session recording is started after a trigger event is detected (see FIG. 3, steps 320 and 330 and FIG. 4, steps 420 and 430), while in the second embodiment, the session recording is carried out continuously even when no trigger event is detected (see FIGS. 7A and 7B, steps S73 and S74). In both embodiments, when a trigger event is detected, monitoring information is sent to the administrator automatically, i.e., without the administrator's specific request.

Another difference between the first and second embodiments is that in the first embodiment, the components that perform the recording function and the trigger event detection function are located within the KVM switch (see FIG. 1, item 100 and FIG. 2, items 102, 104, 106, and 108), while in the second embodiment, those components are located outside of the KVM switches, in a recording system R connected to the KVM switches by a network. Moreover, in the second embodiment, the recording system R may have a master-slave arrangement with increased flexibility.

In addition, the second embodiment expands the definition of trigger events, which include not only keywords described in the first embodiment, but also other types of trigger events.

The various features of the first and second embodiments described above may be combined to construct alternative embodiments. For example, in a first alternative embodiment, the session recording is started only when a trigger event is detected (as in the first embodiment), but the location of the components that perform the recording and the trigger event detection functions are located outside of the KVM switch (as in the second embodiment). In a second alternative embodiment, the location of the components that perform the recording and the trigger event detection functions are located within the KVM switch (as in the first embodiment), but the session recording is carried out continuously even if no trigger event is detected (as in the second embodiment). In a third alternative embodiment, the function of trigger event detection is performed by a component located within the KVM switch (as in the first embodiment), but recording is performed by a system outside of the KVM switch (as in the second embodiment). In this alternative embodiment, recording may be carried out continuously regardless of whether trigger events are detected, or carried out only after a trigger even is detected. In a fourth alternative embodiment, the structure and components are the same as in the first embodiment, except that the definition of trigger events is expanded as in the second embodiment. Other variations are also possible.

The various functions of the KVM switch, user consoles, and recording system (including the master and slave recording servers) may be implemented by suitable hardware, firmware and/or software in the respective components. For example, the various functions performed by these components may be implemented by processors executing program code stored in computer-useable memories in the respective components.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A system for recording and monitoring user interactions with a server, comprising:
    at least one keyboard, video, mouse (KVM) switch connected to a network, the KVM switch including:
        a network interface section for communicating data over the network;
        a switching section coupled to the network interface section; and
        a plurality of server ports coupled to the switching section each adapted for connecting to a server, wherein the switching section forwards data between the network interface section and selected ones of the server ports;
    a recording system connected to the network;
    wherein the KVM switch receives, via the network, keyboard data and mouse data from a user console connected to the network, forwards the keyboard data and mouse data to a selected server port, receives video data representative of desktop images from the selected server port, and processes the video data and transmits it via the network to the user console;
    wherein the KVM switch further transmits the keyboard data and mouse data received from the user console and the video data received from the selected server port to the recording system via the network;
    wherein the recording system records the keyboard data, mouse data and video data received from the KVM switch to generate a record of a login session between the user console and a server connected to the selected server port, detects predefined trigger events based on at least one of the received keyboard data, mouse data and video data, wherein the trigger events are detected by comparing the received keyboard data, mouse data and video data with pre-stored trigger events in an editable database, and wherein when a trigger event is detected, the recording system automatically transmits monitoring information to an administrative console which is different from the user console, via the network without passing through the KVM switch,
    wherein the recording system includes a master recording server and one or more slave recording servers connected to each other, wherein the master recording server dynamically assigns one slave recording server to record data from the KVM switch by transmitting a session ID to the assigned slave recording server and the KVM switch, and
    wherein the assigned slave recording server and the KVM switch use the session ID to authenticate each other via the network, and thereafter, without further participation of the master recording server, the KVM switch transmits the keyboard data, mouse data and video data to the assigned slave recording server and the assigned slave recording server records the keyboard data, mouse data and video data.

2. The system of claim 1, wherein the trigger events include one or more of predefined keywords contained in the keyboard data, predefined mouse operations contained in the mouse data, and predefined images contained in the video data, or combinations thereof.

3. The system of claim 1, wherein the KVM switch further transmits administrative data to the recording system, the administrative data including a user ID of the user and an ID of a server connected to the selected server port.

4. The system of claim 3, wherein the trigger events include one or more of predefined keywords contained in the keyboard data, predefined mouse operations contained in the mouse data, predefined images contained in the video data, predefined user IDs contained in the administrative data, and predefined server IDs contained in the administrative data, or combinations thereof.

5. The system of claim 1, wherein the recording system records the keyboard data, mouse data, and video data by generating video images representing the keyboard data and mouse data and combining the generated video images with the video data received from the KVM switch to generate combined video data which represents both the desktop image and the keyboard and mouse data.

6. The system of claim 5, wherein the monitoring information includes the combined video data for display on a monitor of the administrative console.

7. The system of claim 1, wherein the monitoring information includes a textual message for display on a monitor of the administrative console.

8. The system of claim 1, wherein the assigned slave recording server further detects trigger events based on at least one of the received keyboard data, mouse data and video data, and wherein when a trigger event is detected, the slave recording server notifies the master recording server of the detection,
    wherein in response to the notification, the master recording server transmits a second session ID to the assigned slave recording server and the administrative console, and
    wherein the assigned slave recording server uses the second session ID to authenticate the administrative console via the network, and thereafter, without further participation of the master recording server, the assigned slave recording server transmits the monitoring information to the administrative console.

9. The system of claim 1, wherein the recording system, in response to a review request from the administrative console, transmits requested recorded keyboard data, mouse data and/or video data to the administrative console via the network.

10. The system of claim 1, wherein the KVM switch further transmits snapshot video data obtained from a plurality of server ports to the recording system, the snapshot video data containing video frames representing output video images of the server ports at a plurality of time points, and wherein the recording system records the snapshot video data.

11. The system of claim 10, wherein the KVM switch scans the plurality of server ports which have been pre-specified to generate the snapshot video data.

12. A method implemented in a recording system for recording and monitoring user interactions with a server, comprising:
   receiving, from a KVM switch over a network, keyboard data, mouse data and video data representative of interactions of a user console with a selected server connected to the KVM switch;
   a master recording server of the recording system dynamically assigning one slave recording server of the recording system which is connected to the master recording server to record data from the KVM switch by transmitting a session ID to the assigned slave recording server and the KVM switch, and
   the assigned slave recording server using the session ID to authenticate the KVM switch via the network; and
   recording the keyboard data, mouse data and video data received from the KVM switch to generate a record of a login session between the user console and the selected server;
   detecting trigger events based on at least one of the received keyboard data, mouse data and video data, wherein the trigger events are detected by comparing the received keyboard data, mouse data and video data with pre-stored trigger events in an editable database;
   when a trigger event is detected, automatically transmitting monitoring information to an administrative console which is different from the user console, via the network without passing through the KVM switch,
   wherein the receiving step, the recording step, and the detecting step are performed by the assigned slave recording server without further participation of the master recording server.

13. The method of claim 12, wherein the trigger events include one or more of predefined keywords contained in the keyboard data, predefined mouse operations contained in the mouse data, and predefined images contained in the video data, or combinations thereof.

14. The method of claim 12, wherein the receiving step further receives administrative data including a user ID of a user of the user console and an ID of the selected server.

15. The method of claim 14, wherein the trigger events include one or more of predefined keywords contained in the keyboard data, predefined mouse operations contained in the mouse data, predefined images contained in the video data, predefined user IDs contained in the administrative data, and predefined server IDs contained in the administrative data, or combinations thereof.

16. The method of claim 12, wherein the recording step records the keyboard data, mouse data, and video data by generating video images representing the keyboard data and mouse data and combining the generated video images with the video data received from the KVM switch to generate combined video data which represents both the desktop image and the keyboard and mouse data.

17. The method of claim 16, wherein the monitoring information includes the combined video data for display on a monitor of the administrative console.

18. The method of claim 12, wherein the monitoring information includes a textual message for display on a monitor of the administrative console.

19. The method of claim 12, wherein the automatically transmitting step comprises:
   when a trigger event is detected, the slave recording server notifying the master recording server of the detection;
   in response to the notification, the master recording server transmitting a second session ID to the assigned slave recording server and the administrative console;
   the assigned slave recording server using the second session ID to authenticate the administrative console via the network; and
   the assigned slave recording server transmitting the monitoring information to the administrative console without further participation of the master recording server.

20. The method of claim 12, further comprising:
   in response to a review request from the administrative console, transmitting requested recorded keyboard data, mouse data and/or video data to the administrative console via the network.

21. The method of claim 12, wherein the receiving step further includes snapshot video data from the KVM switch, the snapshot video data containing video frames representing output video images of a plurality of server ports of the KVM switch at a plurality of time points, and
   wherein the recording step further includes recording the snapshot video data.

22. The method of claim 21, further comprising:
   transmitting an instruction to the KVM switch to specify the plurality of server ports for which the snapshots video data are to be obtained.

* * * * *